United States Patent
Jeon et al.

(10) Patent No.: US 9,294,496 B2
(45) Date of Patent: Mar. 22, 2016

(54) APPARATUS AND METHOD FOR ANALYZING VULNERABILITY OF ZIGBEE NETWORK

(71) Applicant: ELECTRONICS AND TELECOMMUNICATIONS RESEARCH INSTITUTE, Daejeon (KR)

(72) Inventors: Yuseok Jeon, Daejeon (KR); Incheol Shin, Daejeon (KR); Jaeduck Choi, Daejeon (KR); Gunhee Lee, Daejeon (KR); Sinkyu Kim, Daejeon (KR); Jungtaek Seo, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 14/264,174

(22) Filed: Apr. 29, 2014

(65) Prior Publication Data

US 2014/0366142 A1    Dec. 11, 2014

(30) Foreign Application Priority Data

Jun. 7, 2013   (KR) .................. 10-2013-0065123

(51) Int. Cl.
| | |
|---|---|
| *H04L 29/06* | (2006.01) |
| *H04W 12/10* | (2009.01) |
| *H04W 12/12* | (2009.01) |
| *H04W 84/18* | (2009.01) |

(52) U.S. Cl.
CPC .......... *H04L 63/1433* (2013.01); *H04W 12/10* (2013.01); *H04W 12/12* (2013.01); *H04W 84/18* (2013.01)

(58) Field of Classification Search
None
See application file for complete search history.

(56) References Cited

U.S. PATENT DOCUMENTS

| | | | |
|---|---|---|---|
| 7,715,800 B2 * | 5/2010 | Sinha | 455/67.11 |
| 2006/0150250 A1 | 7/2006 | Lee et al. | |
| 2007/0173199 A1 * | 7/2007 | Sinha | 455/67.11 |
| 2012/0066764 A1 | 3/2012 | Kim | |
| 2015/0095974 A1 * | 4/2015 | Lee et al. | 726/1 |

FOREIGN PATENT DOCUMENTS

| | | |
|---|---|---|
| KR | 10-2006-0070309 A | 6/2006 |
| KR | 10-2007-0027915 A | 3/2007 |
| KR | 10-2008-0065084 A | 7/2008 |
| KR | 10-2010-0120442 A | 11/2010 |
| KR | 10-1022167 B1 | 3/2011 |
| KR | 10-1042504 B1 | 6/2011 |

* cited by examiner

*Primary Examiner* — Kaveh Abrishamkar
(74) *Attorney, Agent, or Firm* — LRK Patent Law Firm

(57) ABSTRACT

The present invention relates to an apparatus and method for analyzing vulnerability of a Zigbee network. For this, the apparatus for analyzing vulnerability of a Zigbee network present invention includes an allocation supporting unit for analyzing an environment of a Zigbee network and allocating a plurality of analyzers to multiple channels of the Zigbee network. A public vulnerability inspection unit inspects the Zigbee network for predefined public vulnerability via the plurality of analyzers. A new vulnerability analysis unit analyzes new vulnerability of the Zigbee network via the plurality of analyzers.

10 Claims, 6 Drawing Sheets

APPARATUS AND METHOD FOR ANALYZING VULNERABILITY OF ZIGBEE NETWORK

CROSS REFERENCE TO RELATED APPLICATION

This application claims the benefit of Korean Patent Application No. 10-2013-0065123 filed on Jun. 7, 2013, which is hereby incorporated by reference in its entirety into this application.

BACKGROUND OF THE INVENTION

1. Technical Field

The present invention relates to an apparatus and method for analyzing the vulnerability of a Zigbee network.

2. Description of the Related Art

A Zigbee protocol is a protocol used for low-power and low-specification wireless network communication. The Zigbee protocol is suitable for various communication environments thanks to the advantage thereof in that it can be used for a long period of time at low cost. However, a Zigbee network is problematic in that vulnerability based on physical network access has been continuously reported. That is, unless a suitable provision against physical network access is established, various cyber security incidents, such as data forgery, device control, and invasion into an operating network, may occur in widely applied networks.

In relation to this, a conventional Zigbee vulnerability analysis tool is provided. However, such a conventional vulnerability analysis tool is limited in that the analysis of performance constraints of hardware, the multiple allocation of multiple channel devices, the analysis of vulnerability of network topology, the analysis of administrative vulnerability, the analysis of new vulnerability, etc. cannot be supported. Therefore, the development of an apparatus and method capable of inspecting known vulnerability of an existing Zigbee network which has been configured and analyzing new vulnerability is required.

As the prior art related to this, Korean Patent No. 1042504 entitled "Apparatus and method for analyzing a Zigbee-based Ubiquitous Sensor Network (USN) wireless communication environment" is disclosed.

SUMMARY OF THE INVENTION

Accordingly, the present invention has been made keeping in mind the above problems occurring in the prior art, and an object of the present invention is to provide an apparatus and method for analyzing the vulnerability of a Zigbee network, which can simultaneously analyze as many channels as possible among multiple channels of a Zigbee network.

Another object of the present invention is to provide an apparatus and method that can analyze, not only known public vulnerability of a Zigbee network, but also new vulnerability that may newly occur.

In accordance with an aspect of the present invention to accomplish the above objects, there is provided an apparatus for analyzing vulnerability of a Zigbee network, including an allocation supporting unit for analyzing an environment of a Zigbee network and allocating a plurality of analyzers to multiple channels of the Zigbee network; a public vulnerability inspection unit for inspecting the Zigbee network for predefined public vulnerability via the plurality of analyzers; and a new vulnerability analysis unit for analyzing new vulnerability of the Zigbee network via the plurality of analyzers.

Preferably, the allocation supporting unit may allocate one or more analyzers to each channel in use among the multiple channels, based on results of analysis of the environment of the network.

Preferably, the allocation supporting unit may include an environmental information collection module for analyzing the environment of the Zigbee network; and an allocation module for allocating the plurality of analyzers to the multiple channels of the Zigbee network.

Preferably, the environmental information collection module may include at least one of a channel intensity measurement module for measuring signal intensities of the multiple channels; a channel use determination module for determining whether each of the multiple channels is used; an analyzer state determination module for determining states of the plurality of analyzers; a location measurement module for measuring locations of the plurality of analyzers; and an interference determination module for determining whether interference has occurred on each of the multiple channels.

Preferably, the allocation module may further monitor the multiple channels via the environmental information collection module, and reallocate the plurality of analyzers to the multiple channels if states of the multiple channels are varied.

Preferably, the allocation module may be configured to determine that the states of the multiple channels are varied when at least one of variation in the signal intensities of the multiple channels, the use or nonuse of the multiple channels, variation in the states of the analyzers, variation in the locations of the analyzers, and interference on the multiple channels is sensed.

Preferably, the public vulnerability inspection unit may include an attack execution module for analyzing a state of the Zigbee network by executing a network attack on the Zigbee network; a management item inspection module for inspecting whether a management item of the Zigbee network has been set to a preset state; and a network vulnerability inspection module for inspecting the Zigbee network for topology configuration and vulnerable sections using an algorithm used for inspection of the Zigbee network, wherein the public vulnerability inspection unit reports results of analysis performed by the attack execution module, the management item inspection module, and the network vulnerability inspection module to a manager.

Preferably, the new vulnerability analysis unit may include an emulator module for operating the plurality of analyzers in conformity with a preset scenario and analyzing the Zigbee network; a simulation module for simulating a packet communication procedure previously performed by the Zigbee network; and an external equipment interworking module for analyzing the Zigbee network via interworking with external equipment.

In accordance with another aspect of the present invention to accomplish the above objects, there is provided a method of analyzing vulnerability of a Zigbee network, including analyzing, by an allocation supporting unit, an environment of a Zigbee network; allocating, by the allocation supporting unit, a plurality of analyzers to multiple channels of the Zigbee network; inspecting, by a public vulnerability inspection unit, the Zigbee network for predefined public vulnerability via the plurality of analyzers; and analyzing, by a new vulnerability analysis unit, new vulnerability of the Zigbee network via the plurality of analyzers.

Preferably, allocating the plurality of analyzers may be configured to allocate one or more analyzers to each channel in use among the multiple channels, based on results of analysis of the environment of the network.

Preferably, analyzing the environment of the Zigbee network may be configured to analyze the environment of the Zigbee network via an environmental information collection module included in the allocation supporting unit; and allocating the plurality of analyzers is configured to allocate the plurality of analyzers to the multiple channels of the Zigbee network via an allocation module included in the allocation supporting unit.

Preferably, the environmental information collection module may include at least one of a channel intensity measurement module for measuring signal intensities of the multiple channels; a channel use determination module for determining whether each of the multiple channels is used; an analyzer state determination module for determining states of the plurality of analyzers; a location measurement module for measuring locations of the plurality of analyzers; and an interference determination module for determining whether interference has occurred on each of the multiple channels.

Preferably, the method may further include, after allocating the plurality of analyzers, monitoring the multiple channels, wherein if states of the multiple channels are varied, the plurality of analyzers are reallocated to the multiple channels.

Preferably, monitoring the multiple channels may be configured to determine that the states of the multiple channels are varied when at least one of variation in the signal intensities of the multiple channels, the use or nonuse of the multiple channels, variation in the states of the analyzers, variation in the locations of the analyzers, and interference on the multiple channels is sensed.

Preferably, inspecting the predefined public vulnerability via the plurality of analyzers may include analyzing, by an attack execution module, a state of the Zigbee network by executing a network attack on the Zigbee network; inspecting, by a management item inspection module, whether a management item of the Zigbee network has been set to a preset state; and inspecting, by a network vulnerability inspection module, the Zigbee network for topology configuration and vulnerable sections using an algorithm used for inspection of the Zigbee network, wherein results of analysis of the state of the Zigbee network, the management item, and the topology configuration and vulnerable sections of the Zigbee network are reported to a manager.

Preferably, analyzing the new vulnerability via the plurality of analyzers may include operating, by an emulator module, the plurality of analyzers in conformity with a preset scenario and analyzing the Zigbee network; simulating, by a simulation module, a packet communication procedure previously performed by the Zigbee network; and analyzing, by an external equipment interworking module, the Zigbee network via interworking with external equipment.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
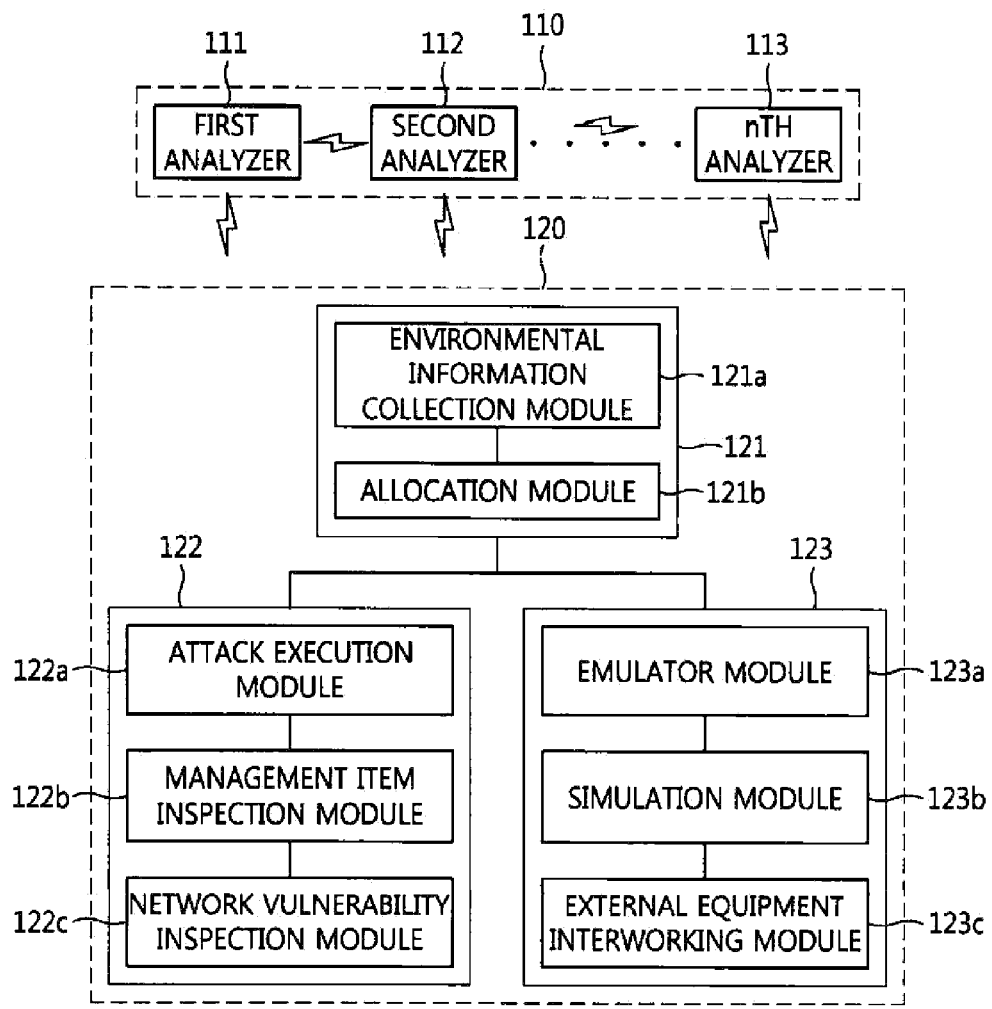
FIG. 1 is a block diagram showing a system for analyzing the vulnerability of a Zigbee network according to an embodiment of the present invention.

The present invention will be described in detail below with reference to the accompanying drawings. In the following description, redundant descriptions and detailed descriptions of known functions and elements that may unnecessarily make the gist of the present invention obscure will be omitted. Embodiments of the present invention are provided to fully describe the present invention to those having ordinary knowledge in the art to which the present invention pertains. Accordingly, in the drawings, the shapes and sizes of elements may be exaggerated for the sake of clearer description.

FIG. 1 is a block diagram showing a system 100 for analyzing the vulnerability of a Zigbee network according to an embodiment of the present invention. Below, the Zigbee network vulnerability analysis system 100 according to the embodiment of the present invention will be described in detail with reference to FIG. 1. The Zigbee network vulnerability analysis system 100 according to the embodiment of the present invention includes a plurality of analyzers 110 and an apparatus 120 for analyzing the vulnerability of a Zigbee network. These components will be described below.

The plurality of analyzers 110 are allocated to the multiple channels of the Zigbee network and are configured to perform packet processing, such as the transmission and reception of packets. That is, the analyzers 110 may transmit and receive packets required for the analysis and monitoring of the communication status of the multiple channels of the Zigbee network, and for the analysis of the public vulnerability and new vulnerability of the Zigbee network, which are performed by the apparatus 120 for analyzing the vulnerability of the Zigbee network, which will be described later.

Further, each of the analyzers 110 may be configured to include an encryption module and a decryption module. That is, each of the analyzers 110 may encrypt or decrypt packets transmitted or received through the Zigbee network vulnerability analysis apparatus 120 and then strengthen security against network analysis.

In addition, each of the analyzers 110 may further include an integrity verification module and a packet data management module. By means of these components, each analyzer 110 may guarantee the integrity of packets independently generated thereby or packets transmitted or received through the Zigbee network vulnerability analysis apparatus 120.

The Zigbee network vulnerability analysis apparatus 120 may be configured to include an allocation supporting unit 121, a public vulnerability inspection unit 122, and a new vulnerability analysis unit 123. Here, the public vulnerability denotes known vulnerability and the new vulnerability denotes unknown vulnerability.

The allocation supporting unit 121 functions to analyze the environment of the Zigbee network and allocate the plurality of analyzers to the multiple channels of the Zigbee network. In this case, the number of channels may typically be 16, but it should be understood that the number of channels is not limited thereto. That is, as will be described later, the plurality of analyzers 110 are allocated to the multiple channels, so that all multiple channels in use may be analyzed.

The allocation supporting unit 121 may include an environmental information collection module 121a and an allocation module 121b. Further, the environmental information collection module 121a may include a channel intensity measurement module, a channel use determination module, an analyzer state determination module, a location measurement module, an interference determination module, and additional modules.

The channel intensity measurement module included in the environmental information collection module 121a functions to measure the intensity of each of the multiple channels. That is, the channel intensity measurement module may allocate the above-described analyzers 110 to the multiple channels depending on the intensities of the channels, thus improving stability.

The channel use determination module included in the environmental information collection module 121a functions to determine whether each of the multiple channels is usable. By the channel use determination module, a situation in which some of the analyzers 110 are allocated to channels that are not actually usable may be avoided. Accordingly, the analysis of the Zigbee network may be more efficiently performed.

The analyzer state determination module included in the environmental information collection module 121a functions to determine the states of the analyzers 110. In greater detail, the analyzer state determination module may determine the current states of the respective analyzers 110, such as the states of the batteries thereof and the transmission or reception capabilities of the channels. By means of this, when the plurality of analyzers 110 are allocated to the multiple channels, the analyzers are arranged in consideration of the current states of the analyzers, and thus more efficient allocation may be realized.

The location measurement module included in the environmental information collection module 121a functions to measure the locations of the plurality of analyzers 110. For example, it is assumed that, among the analyzers 110 shown in FIG. 1, a first analyzer 111 and a second analyzer 112 are allocated to a first channel. For example, if it is assumed that the first analyzer 111 and the second analyzer 112 allocated to the first channel are arranged very close to each other, packets transmitted or received through the first analyzer 111 and the second analyzer 112 will not exhibit a large difference due to a short distance between the analyzers. That is, although the number of analyzers allocated to the first channel is 2 in practice, the results of analysis at this time do not exhibit a large difference from the results of analysis performed by a single analyzer, thus deteriorating efficiency. Accordingly, it is important to determine the locations of the analyzers and allocate analyzers located close to each other to different channels.

The interference determination module included in the environmental information collection module 121a functions to determine whether interference occurs on each of the multiple channels. For example, the module determines whether channel interference caused by Wi-Fi or Bluetooth communication that may occur at the same frequency as that of each of the multiple channels occurs, thus more easily monitoring the multiple channels.

The additional modules included in the environmental information collection module 121a are used to randomly define additional information desired to be collected by a manager so as to determine the states of the multiple channels.

The allocation module 121b functions to allocate the plurality of analyzers to the multiple channels of the Zigbee network. In detail, the allocation module 121b may efficiently allocate the plurality of analyzers to the multiple channels of the network using network environment information collected by the environmental information collection module 121a. That is, the allocation module 121b may allocate the plurality of analyzers 110 to some channels in use among the multiple channels in a multiple manner. In this case, various variables, such as the states of the multiple channels and the analyzers 110, distances between the analyzers 110, and the presence or non-presence of channel interference, are taken into consideration, and thus more efficient allocation is possible. Further, it should be understood that an allocation algorithm used by the allocation module 121b may be varied depending on the definition of a manager. Further, since the plurality of analyzers 110 cannot simultaneously perform the transmission and reception of packets, it should be understood that tools taking charge of transmission and reception may be separated and used, and one of the plurality of analyzers 110 may distribute time depending on the intention of the manager to separate a packet transmission function and a packet reception function.

Further, as a result of the analysis by the environmental information collection module 121a, if it is determined that the states of the multiple channels are varied, the allocation module 121b may reallocate the analyzers 100 to the multiple channels. Here, the allocation module 121b may determine that the states of the multiple channels are varied if at least one of, for example, variation in the signal intensities of the multiple channels, the use or nonuse of the multiple channels, variation in the states of the analyzers, variation in the locations of the analyzers, and interference on the multiple channels, is sensed. Via such a channel allocation procedure, the simultaneous analysis of the multiple channels of the Zigbee network may be efficiently performed.

The public vulnerability inspection unit 122 may function to inspect the Zigbee network for public vulnerability which is known or predefined. The public vulnerability inspection unit 122 may be configured to include an attack execution module 122a, a management item inspection module 122b, and a network vulnerability inspection module 122c. Further, the public vulnerability inspection unit 122 may notify the manager of the analysis results generated by the attack execution module 122a, the management item inspection module 122b, and the network vulnerability inspection module 122c through a separate display module.

The attack execution module 122a functions to analyze the state of the Zigbee network by executing a network attack on the Zigbee network. Here, the network attack includes all of known attack methods among existing network attack methods of attacking the Zigbee network and new attack methods newly defined by the manager. For example, the known attack methods may include a Home Area Network Identifier (HANIdentifier: HANID) Conflict attack, a Sybil attack, a Denial-of-Service (DoS) attack on Advanced Encryption Standard Counter Mode (AES-CTR), a Distributed Denial of Service (DDoS) attack, etc., which may be supported by the attack execution module 122a. Since such attack methods have been well-known in the art, an additional description thereof will be omitted.

The attack execution module 122a may further determine whether the attack made by attack execution has succeeded, via an attack monitoring function. That is, the attack execution module 122a may determine whether the attack has succeeded by monitoring the state of a target of attack. Further, by using the function of adding a new attack function via the manager, the attack execution module 122a may store and perform attack methods either additionally discovered or generated by the manager, in addition to the existing attack methods.

The management item inspection module 122b functions to inspect whether management items for the Zigbee network have been set to preset states. That is, the management item inspection module 122b functions to inspect whether management items related to various performance options, such as the security, stability, integrity, and processing speed of the Zigbee network, have been set to optimal states. Here, the management items may include, for example, United States Computer Emergency Readiness Team (US-CERT) recommendation or principal management items. For example, when it is difficult to directly inspect the management items, it is possible to inspect the management items by acquiring information through the manager, that is, by manually inputting information through the manager. For management items set to undesirable states as a result of this inspection, such results may be reported to the manager in the form of a Graphical User Interface (GUI) via a separate display unit. That is, for the management items set to undesirable states, information about recommended states, recommended management methods, or the like may be provided to the manager in the form of the GUI.

The network vulnerability inspection module 122c functions to inspect the Zigbee network for topology configuration and vulnerable sections using an algorithm used for the inspection of the Zigbee network. First, the network vulnerability inspection module 122c may determine which network topology has been used to configure the Zigbee network. Thereafter, the network vulnerability inspection module 122c may analyze vulnerability in network configuration. In this case, the analysis of vulnerability may be performed by inspecting the Zigbee network for various items in relation to whether a plurality of devices have been concentrated and distributed to a specific master node in the Zigbee network, whether current network topology configuration is preferable, etc.

For this, the network vulnerability inspection module 122c may evaluate network topology using various types of network vulnerability analysis algorithms. In this case, network vulnerability analysis algorithms are not limited to any specific algorithms and may be generated, selected, and changed by the manager in various manners. Further, the network vulnerability inspection module 122c may additionally input a parameter required for the selected algorithm, for example, a threshold, and may evaluate the vulnerability of network topology based on the parameter.

The network vulnerability inspection module 122c may be configured to, if the evaluation of vulnerability has been completed, determine the vulnerable elements of network topology, and recommend more preferable topology configuration to the manager or provide information about vulnerable sections.

As described above, the public vulnerability inspection unit 122 may perform attacks on the network, the inspection of management items, the analysis of network vulnerability, etc. In this case, all of the functions performed by the public vulnerability inspection unit 122 may be performed by settings of the manager, or only some of the functions may be selectively performed.

The new vulnerability analysis unit 123 functions to analyze new vulnerability of the Zigbee network. That is, the new vulnerability analysis unit 123 may function to analyze potential vulnerability that may occur in the future or that has not existed in the past, other than known public vulnerability. The new vulnerability analysis unit 123 may include an emulator module 123a, a simulation module 123b, and an external equipment interworking module 123c.

The emulator module 123a functions to analyze the Zigbee network by operating the plurality of analyzers 110 in conformity with a predefined scenario. That is, the emulator module 123a may transmit a packet configured in conformity with the predefined scenario to the plurality of analyzers 110 and may determine whether the Zigbee network is correctly operated. In this case, if the packet has been correctly transmitted or received according to the intention or if accurate results have been derived, it may be concluded that the Zigbee network is not abnormal. Otherwise it is possible to discover and solve new vulnerability by allowing the manager to perform the task of determining the operation of the Zigbee network.

The simulation module 123b functions to provide a packet communication procedure previously performed on the Zigbee network to the manager. The simulation module 123b may record an operation previously performed on the network and replay the corresponding operation so as to analyze new vulnerability. That is, the simulation module 123b may allow the manager to analyze the packets transmitted or received through the actual Zigbee network, thus assisting in discovering new vulnerability. For this, the simulation module 123b may include the function of recognizing a target packet to be simulated and the function of executing a simulation.

The external equipment interworking module 123c functions to analyze the Zigbee network while working in conjunction with external equipment. For example, the external equipment interworking module 123c may work in conjunction with other equipment such as a Global Positioning System (GPS). By means of this, upon analyzing vulnerability through the Zigbee network vulnerability analysis apparatus 120 according to the present invention, wider and more reliable analysis may be performed.

In addition, the new vulnerability analysis unit 123 may further include a fuzzing module and a wardriving module in addition to the above-described emulator module 123a, simulation module 123b, and external equipment interworking module 123c. By means of this configuration, the new vulnerability analysis unit 123 may further perform the function of analyzing new vulnerability using a fuzzing function and a wardriving function.

Further, all of the functions performed by the new vulnerability analysis unit 123 may be performed or only some of the functions may be selectively performed, depending on the settings of the manager.

Figure 2:
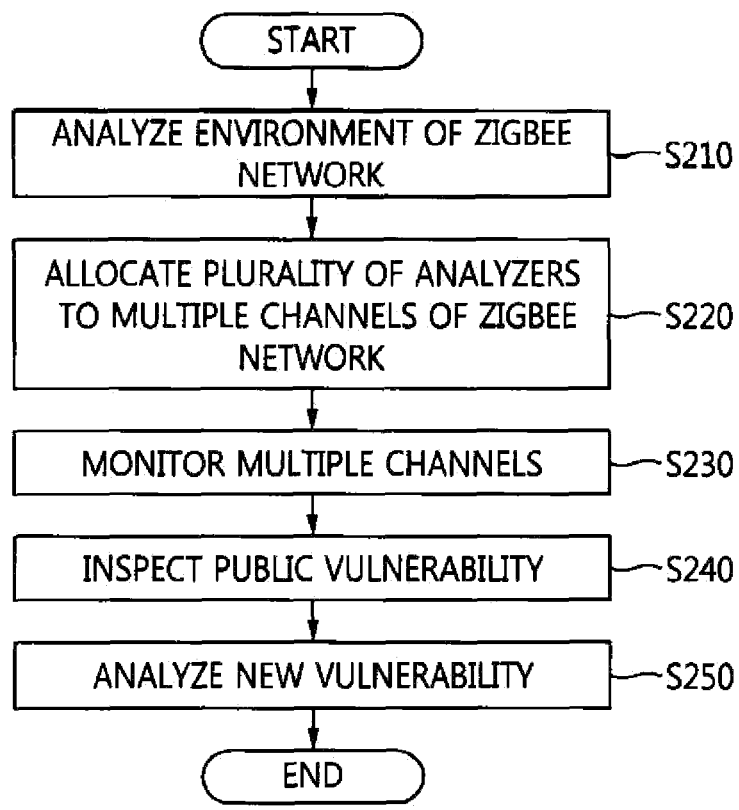
FIG. 2 is a flowchart showing a method of analyzing the vulnerability of a Zigbee network according to an embodiment of the present invention.

FIG. 2 is a flowchart showing a method of analyzing the vulnerability of a Zigbee network according to an embodiment of the present invention. Below, the method of analyzing the vulnerability of the Zigbee network according to the embodiment of the present invention will be described in detail with reference to FIG. 2. In the following description, a description of a configuration identical to that described above with reference to FIG. 1 will be omitted here for the simplicity of description of the specification.

First, by the allocation supporting unit, the environment of the Zigbee network is analyzed at step S210. In greater detail, step S210 may be performed by the environmental information collection module included in the allocation supporting unit. Analysis at step S210 is performed after the environmental information of the Zigbee network has been collected. Here, the collected environmental information may include various types of information, for example, the signal intensities of multiple channels, the use or nonuse of the channels, the states of a plurality of analyzers, the locations of the analyzers, the presence or non-presence of interference on the multiple channels, etc., and may be variously added in addition to the exemplary information depending on the circumstances.

Thereafter, by the allocation supporting unit, the plurality of analyzers are allocated to the multiple channels of the Zigbee network at step S220. That is, step S220 may be configured to allocate the analyzers to the multiple channels based on the environment of the Zigbee network analyzed at step S210. As described above, one or more analyzers are allocated to each channel in use among the multiple channels, and the above-described various items are taken into consideration, thus enabling the network to be more efficiently analyzed.

Next, by the allocation supporting unit, the multiple channels are monitored at step S230. Via the monitoring procedure at step S230, if variation in the states of the multiple channels of the Zigbee network is sensed, the plurality of analyzers may be reallocated to the multiple channels. Here, when, at least one of variation in the signal intensities of the multiple channels, the use or nonuse of the multiple channels, variation in the states of the analyzers, variation in the locations of the analyzers, and interference on the multiple channels, is sensed as the variation in the states of multiple channels, it may be determined that the states of the multiple channels have varied.

Thereafter, by the public vulnerability inspection unit, public vulnerability predefined for the Zigbee network is inspected via the plurality of analyzers at step S240. As described above with reference to FIG. 1, step S240 may be configured to execute an attack on the network, inspect management items, or inspect network vulnerability. Since the analysis of public vulnerability has been described in detail with reference to FIG. 1, a description thereof will be omitted here for simplicity of the description of the specification. If the analysis of public vulnerability has been completed in this way, the results of the analysis at step S240 may be reported to the manager. In this case, a reporting method may be implemented using, for example, a display method based on a separate display unit.

Therefore, by the new vulnerability analysis unit, new vulnerability of the Zigbee network is analyzed via the plurality of analyzers at step S250. As described above with reference to FIG. 1, step S250 may be performed via emulation and simulation of the Zigbee network, interworking with external equipment, etc. Since the analysis of new vulnerability has been described in detail with reference to FIG. 1, a description thereof will be omitted here for the simplicity of the description of the specification. Further, similarly to step S240, step S250 may be configured to report the results of the analysis of new vulnerability to the manager. In this case, a reporting method may be implemented using, for example, a display method based on a separate display unit.

Figure 3:
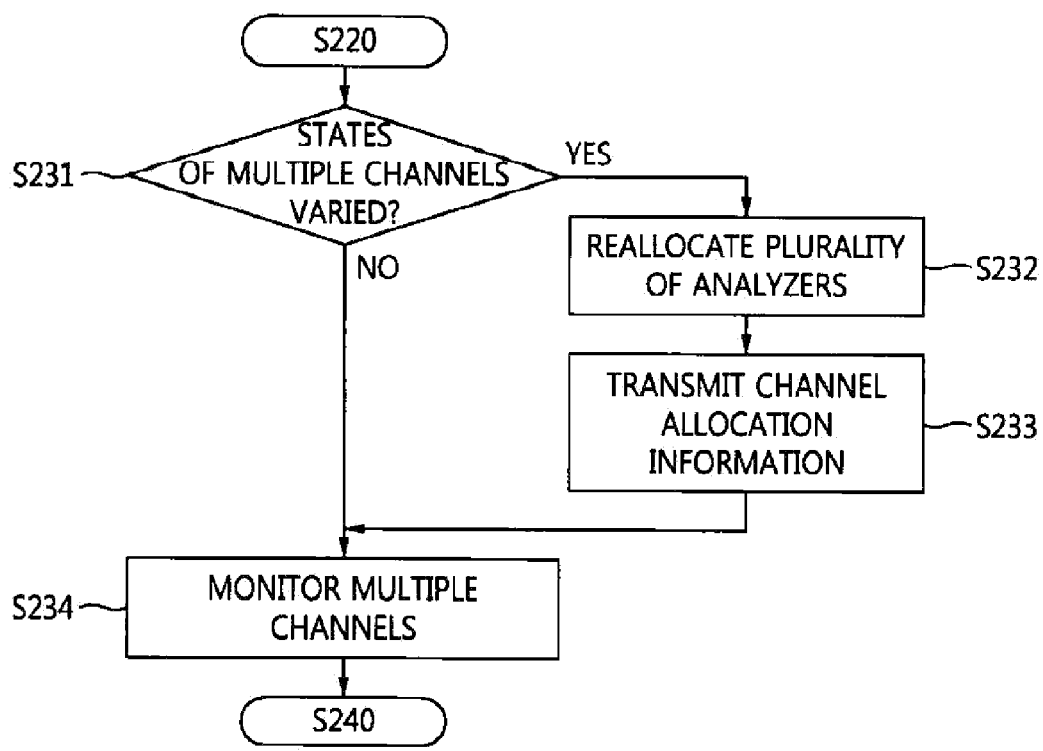
FIG. 3 is a flowchart showing a procedure for monitoring multiple channels in the method of analyzing the vulnerability of the Zigbee network according to an embodiment of the present invention.

FIG. 3 is a flowchart showing a procedure for monitoring multiple channels in the method of analyzing the vulnerability of a Zigbee network according to an embodiment of the present invention. The procedure for monitoring multiple channels shown in FIG. 2 will be described in detail below with reference to FIG. 3.

First, it is determined whether the states of the multiple channels are varied at step S231. A basis for the determination at step S231 may be at least one of variation in the signal intensities of the multiple channels, the use or nonuse of the multiple channels, variation in the states of a plurality of analyzers, variation in the locations of the analyzers, and interference on the multiple channels, as described above with reference to FIG. 1. If the variation in states has been sensed at step S231, control proceeds to step S232, otherwise control proceeds to step S234.

The plurality of analyzers are reallocated to the multiple channels at step S232. That is, if the variation in the states has been sensed at step S231, the environmental information of the Zigbee network is recollected and then the analyzers are reallocated to the multiple channels.

Thereafter, information about channel allocation is transmitted at set S233. Then, control proceeds to step S234.

The multiple channels are monitored at step S234. If, during the monitoring of the channels at step S234, a request for the inspection of public vulnerability is received, control proceeds to step S240.

Figure 4:
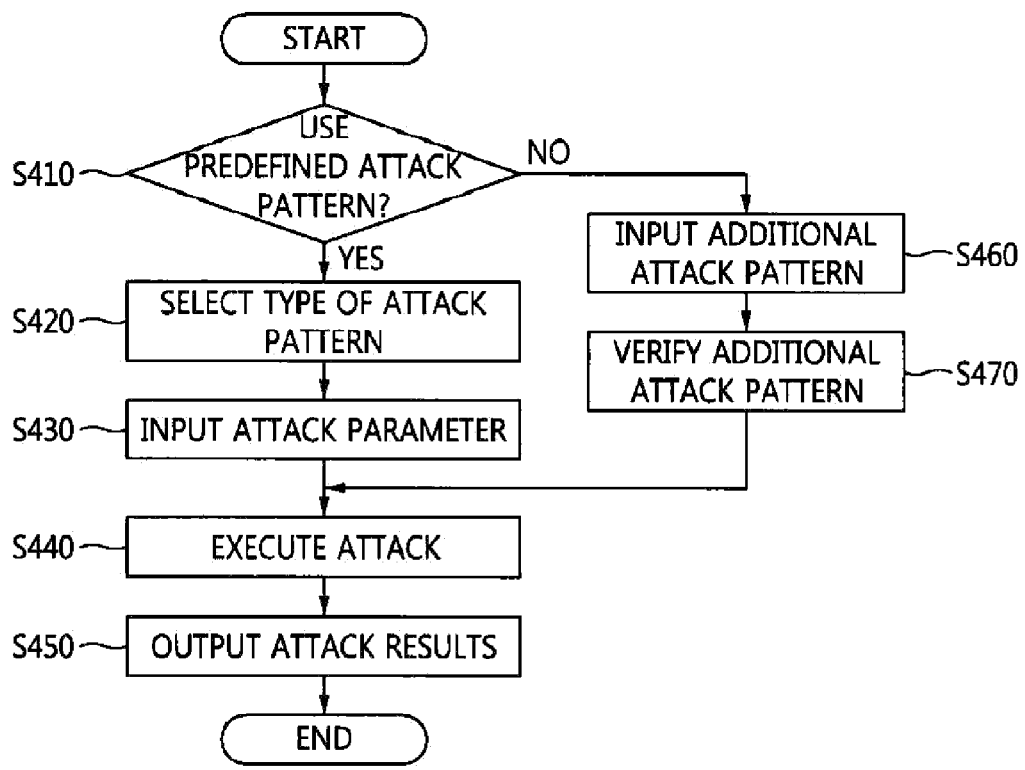
FIG. 4 is a flowchart showing a procedure performed by an attack execution module at the public vulnerability inspection step of the method of analyzing the vulnerability of the Zigbee network according to an embodiment of the present invention.

FIG. 4 is a flowchart showing a procedure performed by the attack execution module at the public vulnerability inspection step of the method of analyzing the vulnerability of the Zigbee network according to an embodiment of the present invention. Below, the procedure of executing an attack on the Zigbee network is further described with reference to FIG. 4.

First, it is determined whether to use a predefined attack pattern at step S410. Determination at step S410 may be performed depending on the selection of the manager or the selection of a predefined attack pattern. If it is determined at step S410 that the predefined attack pattern is to be used, control proceeds to step S420, otherwise control proceeds to step S460.

Then, the type of attack pattern is selected at step S420. Here, the attack pattern may be at least one of, for example, a HANID Conflict attack, a Sybil attack, a Denial-of-Service (DOS) attack on AES-CTR, and a DDoS attack, as described above. Further, the type of attack pattern is not limited to such an example and any of various patterns may be selected depending on the settings of the manager.

Thereafter, information required for attacking is input based on the attack pattern, selected at step S420, at step S430. As an example, in the case of a DoS Attack on AES-CTR, a frame counter value or the address of a target of attack is essentially required. Accordingly, the input of information enabling the attack selected at step S420 to be correctly executed is required.

Thereafter, a network attack on the Zigbee network is executed at step S440.

Next, the results of the network attack executed at step S440 are output at step S450. Step S450 may be configured using, for example, a method of outputting result information to the manager via a separate display unit.

Step S460 is performed if it is determined at step S410 that the predefined attack pattern is not to be used, and is configured to input an additional attack pattern via the manager. In this case, the additional attack pattern may correspond to an attack pattern which will appear in the future, or an experimental attack pattern which will be executed by the manager, as described above with reference to FIG. 1.

Thereafter, it is verified whether error is not present in the attack pattern generated at step S460, and if it is verified that error is not present, control proceeds to step S440 to perform the above procedures.

Figure 5:
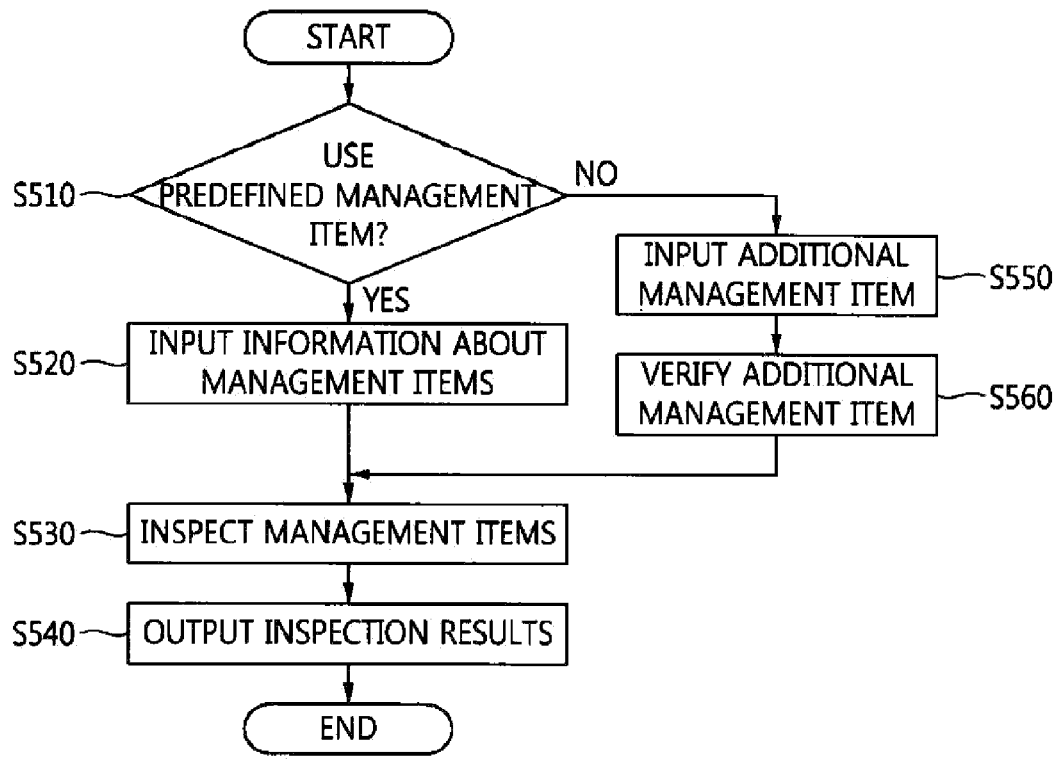
FIG. 5 is a flowchart showing a procedure performed by a management item inspection module at the public vulnerability inspection step of the method of analyzing the vulnerability of the Zigbee network according to an embodiment of the present invention.

FIG. 5 is a flowchart showing a procedure performed by the management item inspection module at the public vulnerability inspection step of the method of analyzing the vulnerability of the Zigbee network according to an embodiment of the present invention. Below, the procedure for inspecting the management items will be described with reference to FIG. 5.

First, it is determined whether to inspect predefined management items at step S510. Here, as described above, the predefined management items are US-CERT recommendations and principal administrative items, and are configured to inspect whether the Zigbee network keeps such recommendations. If it is determined at step S510 that the predefined management items are to be used, control proceeds to step S520, otherwise control proceeds to step S550. Further, if it is determined at step S510 that the predefined management items are to be used, all or some of the predefined management items may be inspected depending on the settings of the manager.

Information required for the inspection of the predefined management items is input at step S520.

Thereafter, the predefined management items of the Zigbee network are inspected at step S530, and the results of the inspection of the management items are output to the manager at step S540. Step S540 may be performed using a method of outputting result information to the manager via a separate display unit, similarly to other reporting methods.

Step S550, which is performed when a new management item is added in addition to the predefined management items used at step S510, is configured to input an additional management item from the manager.

Thereafter, the additional management item input at step S550 is verified at step S560. If it is determined at step S560 that error is not present in the additional management item, control proceeds to step S530 to perform the above procedures.

Figure 6:
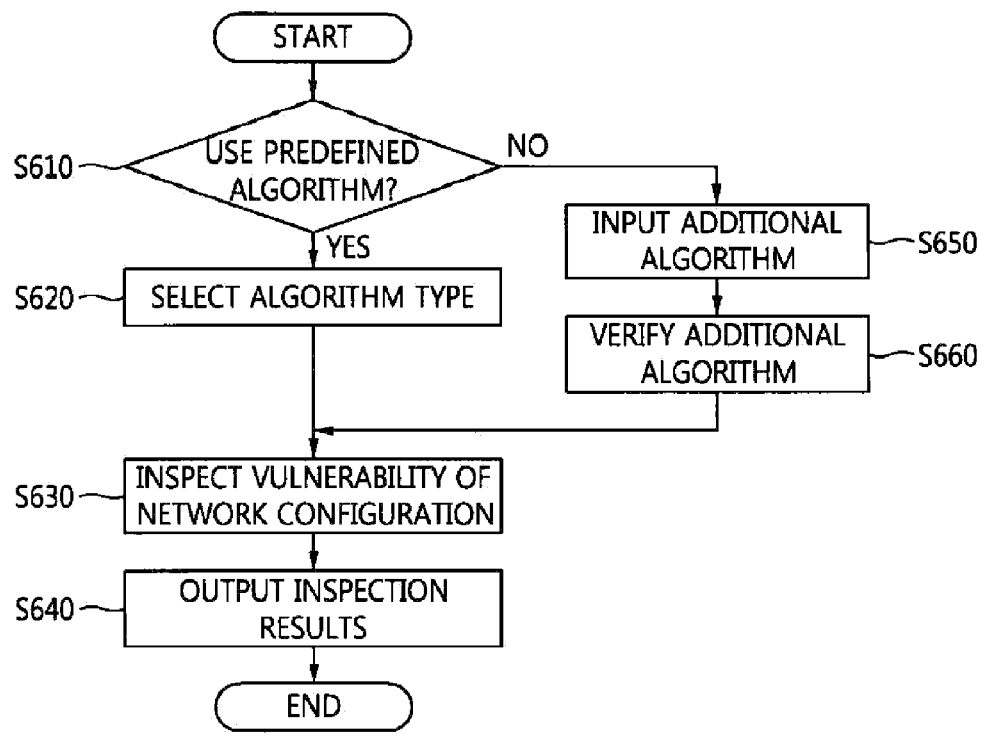
FIG. 6 is a flowchart showing a procedure performed by a network vulnerability inspection module at the public vulnerability inspection step of the method of analyzing the vulnerability of the Zigbee network according to an embodiment of the present invention.

FIG. 6 is a flowchart showing a procedure performed by the network vulnerability inspection module at the public vulnerability inspection step of the method of analyzing the vulnerability of the Zigbee network according to an embodiment of the present invention.

First, it is determined whether to use a predefined algorithm at step S610. Here, the algorithm is an algorithm used to inspect the Zigbee network, and functions to inspect the Zigbee network for a network topology and vulnerable sections. If it is determined at step S610 that the predefined algorithm is to be used, control proceeds to step S620, otherwise control proceeds to step S650.

At step S620, the type of algorithm is selected. Here, the algorithm is not limited to a specific algorithm and all various algorithms used to inspect the Zigbee network may be included in the algorithm to be selected.

Thereafter, the Zigbee network is inspected for the vulnerability of network configuration via the algorithm, selected at step S620, at step S630.

Thereafter, the results of the inspection at step S630 are output at step S640. Step S640 may be configured using, for example, a method of outputting result information to the manager via a separate display unit.

Step S650, which is performed when the manager uses a new algorithm, is configured to input an additional algorithm from the manager.

Thereafter, it is verified whether error is not present in the additional algorithm, input at step S650, at step S660. If it is verified that error is not present, control proceeds to step S630 to perform the above-described procedures.

Instructions of the principles of the present invention may be implemented in a combination of hardware and software. Further, software may be implemented as an application program actually implemented in a program storage unit. The application program may be uploaded to a machine including any suitable architecture and may be executed by the machine. Preferably, the machine may be implemented on a computer platform having hardware such as one or more Central Processing Units (CPUs), a computer processor, Random Access Memory (RAM), and Input/Output (I/O) interfaces. Further, the computer platform may include an operating system and a micro-instruction code. Various processes and functions described here may be a part of the micro-instruction code, a part of the application program, or a random combination thereof; and may be executed by various processing devices including CPUs. In addition, various peripheral devices such as an additional data storage unit and a printer may be connected to the computer platform.

Since some of the components of the configuration system and the methods shown in the attached drawings are preferably implemented using software, it should be additionally understood that actual connections between the system components or process functional blocks may vary depending on the way in which the principles of the present invention are programmed. Here, given the instructions, those skilled in the art will take into consideration the principles of the present invention, similar embodiments, or configurations.

As described above, in accordance with the apparatus and method for analyzing the vulnerability of a Zigbee network according to the present invention, there is an advantage in that multi-monitoring of multiple channels of the Zigbee network and simultaneous inspection of vulnerability are possible.

Further, in accordance with the apparatus and method for analyzing the vulnerability of a Zigbee network according to the present invention, the Zigbee network may be inspected for not only known vulnerability but also new vulnerability.

Although exemplary embodiments have been described with reference to the attached drawings, it should be understood that the principles of the present invention are not limited by those embodiments, and various changes and modifications may be implemented by those skilled in the art, without departing from the scope or spirit of the principles of the present invention. Those changes and modifications should be interpreted as being included in the scope of the principles of the present invention, as will be described below in the accompanying claims.

As described above, optimal embodiments of the present invention have been disclosed in the drawings and the specification. Although specific terms have been used in the present specification, these are merely intended to describe the present invention and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An apparatus for analyzing vulnerability of a Zigbee network, comprising:
   an allocation supporting unit for analyzing an environment of a Zigbee network and allocating a plurality of analyzers to multiple channels of the Zigbee network;

a public vulnerability inspection unit for inspecting the Zigbee network for predefined public vulnerability via the plurality of analyzers; and a new vulnerability analysis unit for analyzing new vulnerability of the Zigbee network via the plurality of analyzers, wherein the allocation supporting unit allocates one or more analyzers to only each channel in use among the multiple channels, based on results of analysis of the environment of the network, wherein the public vulnerability inspection unit comprises:

an attack execution module for analyzing a state of the Zigbee network by executing a network attack on the Zigbee network;

a management item inspection module for inspecting whether a management item of the Zigbee network has been set to a preset state; and a network vulnerability inspection module for inspecting the Zigbee network for topology configuration and vulnerable sections using an algorithm used for inspection of the Zigbee network, wherein the public vulnerability inspection unit reports results of analysis performed by the attack execution module, the management item inspection module, and the vulnerability inspection module to a manager, and wherein the new vulnerability analysis unit comprises:

an emulator module for operating the plurality of analyzers in conformity with a preset scenario and analyzing the Zigbee network;

a simulation module for simulating a packet communication procedure previously performed by the Zigbee network; and an external equipment interworking module for analyzing the Zigbee network via interworking with external equipment.

2. The apparatus of claim 1, wherein the allocation supporting unit comprises:

an environmental information collection module for analyzing the environment of the Zigbee network; and an allocation module for allocating the plurality of analyzers to the multiple channels of the Zigbee network.

3. The apparatus of claim 2, wherein the environmental information collection module comprises at least one of:

a channel intensity measurement module for measuring signal intensities of the multiple channels;

a channel use determination module for determining whether each of the multiple channels is used;

an analyzer state determination module for determining states of the plurality of analyzers;

a location measurement module for measuring locations of the plurality of analyzers; and an interference determination module for determining whether interference has occurred on each of the multiple channels.

4. The apparatus of claim 3, wherein the allocation module further monitors the multiple channels via the environmental information collection module, and reallocates the plurality of analyzers to the multiple channels if states of the multiple channels are varied.

5. The apparatus of claim 4, wherein the allocation module is configured to determine that the states of the multiple channels are varied when at least one of variation in the signal intensities of the multiple channels, the use or nonuse of the multiple channels, variation in the states of the analyzers, variation in the locations of the analyzers, and interference on the multiple channels is sensed.

6. A method of analyzing vulnerability of a Zigbee network, comprising:

analyzing, by an allocation supporting unit, an environment of a Zigbee network;

allocating, by the allocation supporting unit, a plurality of analyzers to multiple channels of the Zigbee network;

inspecting, by a public vulnerability inspection unit, the Zigbee network for predefined public vulnerability via the plurality of analyzers; and analyzing, by a new vulnerability analysis unit, new vulnerability of the Zigbee network via the plurality of analyzers, wherein allocating the plurality of analyzers is configured to allocate one or more analyzers to only each channel in use among the multiple channels, based on results of analysis of the environment of the network, wherein inspecting the predefined public vulnerability via the plurality of analyzers comprises:

analyzing, by an attack execution module, a state of the Zigbee network by executing a network attack on the Zigbee network;

inspecting, by a management item inspection module, whether a management item of the Zigbee network has been set to a preset state; and inspecting, by a network vulnerability inspection module, the Zigbee network for topology configuration and vulnerable sections using an algorithm used for inspection of the Zigbee network, wherein results of analysis of the state of the Zigbee network, the management item, and the topology configuration and vulnerable sections of the Zigbee network are reported to a manager, and wherein analyzing the new vulnerability via the plurality of analyzers comprises:

operating, by an emulator module, the plurality analyzers in conformity with a preset scenario and analyzing the Zigbee network;

simulating, by a simulation module, a packet communication procedure previously performed by the Zigbee network; and analyzing, by an external interworking module, the Zigbee network via interworking with external equipment.

7. The method of claim 6, wherein:

analyzing the environment of the Zigbee network is configured to analyze the environment of the Zigbee network via an environmental information collection module included in the allocation supporting unit; and allocating the plurality of analyzers is configured to allocate the plurality of analyzers to the multiple channels of the Zigbee network via an allocation module included in the allocation supporting unit.

8. The method of claim 7, wherein the environmental information collection module comprises at least one of:

a channel intensity measurement module for measuring signal intensities of the multiple channels;

a channel use determination module for determining whether each of the multiple channels is used;

an analyzer state determination module for determining states of the plurality of analyzers;

a location measurement module for measuring locations of the plurality of analyzers; and an interference determination module for determining whether interference has occurred on each of the multiple channels.

9. The method of claim 8, further comprising, after allocating the plurality of analyzers, monitoring the multiple channels, wherein if states of the multiple channels are varied, the plurality of analyzers are reallocated to the multiple channels.

10. The method of claim 9, wherein monitoring the multiple channels is configured to determine that the states of the multiple channels are varied when at least one of variation in the signal intensities of the multiple channels, the use or nonuse of the multiple channels, variation in the states of the analyzers, variation in the locations of the analyzers, and interference on the multiple channels is sensed.

* * * * *